(12) United States Patent
Herrmann et al.

(10) Patent No.: US 10,724,876 B2
(45) Date of Patent: Jul. 28, 2020

(54) LINEAR DISPLACEMENT SENSOR

(71) Applicant: Robert Bosch GmbH, Stuttgart (DE)

(72) Inventors: Ingo Herrmann, Friolzheim (DE);
Fabian Utermoehlen, Leonberg (DE);
Andreas Merz, Freiberg am Neckar (DE); Stefan Leidich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 15/775,981

(22) PCT Filed: Oct. 19, 2016

(86) PCT No.: PCT/EP2016/075019
§ 371 (c)(1),
(2) Date: May 14, 2018

(87) PCT Pub. No.: WO2017/102137
PCT Pub. Date: Jun. 22, 2017

(65) Prior Publication Data
US 2018/0328759 A1    Nov. 15, 2018

(30) Foreign Application Priority Data
Dec. 15, 2015   (DE) .................. 10 2015 225 221

(51) Int. Cl.
*G01D 5/20*       (2006.01)
*G01D 5/244*      (2006.01)
(52) U.S. Cl.
CPC ....... *G01D 5/2053* (2013.01); *G01D 5/24438* (2013.01)
(58) Field of Classification Search
CPC .................................................. G01D 5/2053
See application file for complete search history.

(56) References Cited

U.S. PATENT DOCUMENTS

2007/0001666 A1*   1/2007  Lee ............... G01D 5/2258
                                               324/207.15

FOREIGN PATENT DOCUMENTS

| DE | 42 39 635 A1 | 5/1994 |
| DE | 10 2004 033 083 A1 | 1/2006 |
| WO | 2007/000653 A1 | 1/2007 |

OTHER PUBLICATIONS

International Search Report corresponding to PCT Application No. PCT/EP2016/075019, dated Dec. 20, 2016 (German and English language document) (5 pages).

* cited by examiner

*Primary Examiner* — Jas A Sanghera
(74) *Attorney, Agent, or Firm* — Maginot, Moore & Beck LLP

(57) ABSTRACT

A linear-displacement sensor includes a base element arranged with a sensor coil and an excitation coil in such a manner that an AC voltage is induced in the sensor coil upon application of an AC voltage to the excitation coil. An at least partly electrically conductive sliding element is configured to be shifted relative to the base element in a direction along the measurement path. The sliding element has a variable geometry along the measurement path to inductively couple partial turns of the sensor coil with the excitation coil. A correction coil is arranged above a geometry of the sliding element so that an inductive coupling of the correction coil and hence an amplitude of an AC voltage induced in the correction coil is dependent on a lateral offset of the sliding element in relation to the base element.

14 Claims, 5 Drawing Sheets

LINEAR DISPLACEMENT SENSOR

This application is a 35 U.S.C. § 371 National Stage Application of PCT/EP2016/075019, filed on Oct. 19, 2016, which claims the benefit of priority to Serial No. DE 10 2015 225 221.3, filed on Dec. 15, 2015 in Germany, the disclosures of which are incorporated herein by reference in their entirety.

The disclosure relates to a linear-displacement sensor.

BACKGROUND

Linear-displacement sensors can be employed to determine a relative shift of two components along a substantially straight measurement path. This shift may be specified by a position or relative position (that is to say, a numerical value) of the components.

For instance, a linear-displacement sensor may be based on the eddy-current principle. DE 10 2004 033 083 A1, for instance, presents an eddy-current sensor which is arranged on an outer contour of a wheel. The measuring signal is a change in frequency of a resonant circuit as a consequence of a change in inductance by scanning of a sensor coil with an electrically conductive track. The sensor coil induces in the track an eddy current which results in a change in inductance of the sensor coil which is interconnected in the resonant circuit, the resonant frequency of which changes as a result. A robust design as regards tolerance requires, as a rule, the use of several sensor coils and several conductive tracks. A tilting and a change of the spacing of the track in relation to the sensor coil can result in inaccuracies of measurement, since the eddy-current effect exhibits a strong non-linear spacing dependence.

WO 2007/000653 A1 presents a linear-displacement sensor with coupled sensor coils which couple into an electrically conductive sliding element. Coupled sensor coils can exhibit a distinctly greater robustness in relation to changes of spacing or cases of tilting between the sliding element and the sensor coils, but may entail a higher measuring error in the case of a lateral offset of the sliding element (orthogonally to the measurement path).

SUMMARY

Embodiments of the disclosure can advantageously provide a cost-effective and accurately-measuring linear-displacement sensor that takes up little construction space.

The disclosure relates to a linear-displacement sensor that can be used in the surround field of a vehicle (car, truck, motorcycle, commercial vehicles). For instance, the linear-displacement sensor can be used for measuring the spring-compression depth of two-wheeled vehicles or for detecting the gear position in automatic transmissions.

According to one embodiment of the disclosure, the linear-displacement sensor includes a base element with a sensor coil and with an excitation coil, which are arranged in such a manner that an AC voltage is induced in the sensor coil when an AC voltage is applied to the excitation coil. For instance, the sensor coil and the excitation coil may be realized as planar coils in a printed circuit board which is provided by the base element.

The linear-displacement sensor further includes an at least partly electrically conductive sliding element which is capable of being shifted relative to the base element in a direction along a measurement path. The sliding element may, for instance, have been manufactured from metal and/or be substantially cuboid, in which case it can be guided along the measurement path via its lateral edges on a rail provided by the base element.

The sensor coil exhibits two opposite-sense partial turns, and the sliding element has a variable geometry along the measurement path, above which the sensor coil is arranged, so that an inductive coupling of the partial turns of the sensor coil with the excitation coil, and hence an amplitude of the AC voltage induced in the sensor coil, is dependent on a relative position of the sliding element in relation to the base element. By virtue of the two opposite-sense partial turns— that is to say, partial turns through which, respectively, a current flows in the opposite direction (for instance, around to the left or to the right) in the presence of a voltage applied to the coil—the excitation coil cannot induce an AC voltage in the sensor coil if the two partial turns couple with the excitation coil with the same inductance. By reason of the variable geometry of the sliding element (such as, for instance, an oblique groove in the sliding element), the inductive coupling of the partial turns is, however, dependent on the relative position of the sliding element. Accordingly, the amplitude of the induced AC voltage is also dependent on the relative position, and from the amplitude the relative position of the sliding element can be calculated by an evaluating unit.

The amplitude of the AC voltage of a coil (correction coil and/or sensor coil), which can be measured by an evaluating unit, can be construed as a signal of this coil. This signal can then be digitized and/or processed further by the evaluating unit.

A partial turn of a coil may comprise one or more conductor loops of the coil, which (in a direction of viewing toward the aperture of the coil) pass around the same area. A crossing-point of conductor loops of a coil may separate two partial turns of a coil from one another. This crossing-point can be construed as a junction of the two partial turns.

The linear-displacement sensor further includes a correction coil which is arranged above a geometry of the sliding element which is constant along the measurement path, so that an inductive coupling of the correction coil, and hence an amplitude of an AC voltage induced in the correction coil, is dependent on a lateral offset of the sliding element in relation to the base element. By a "lateral offset" in this case, a shift of the sliding element relative to the base element substantially orthogonally to the measurement path may be understood. Such a lateral offset may arise by virtue of construction tolerances.

In the case of a lateral offset of the sliding element, the coupling of the sensor coil with the excitation coil changes, and the measurement may be falsified—that is to say, the evaluating unit determines a relative position that may exhibit an offset from the actual relative position. The correction coil serves to correct or to compensate for this offset. Also in the correction coil an AC voltage is induced by an excitation coil (for instance, a separate excitation coil or the excitation coil of the sensor coil), which, however, by reason of the constant geometry (such as, for instance, a groove parallel to the measurement path and/or an edge of the sliding element) does not depend on the relative position along the measurement path but depends on the lateral offset.

For this purpose the evaluating unit can, for instance, measure, in addition to the amplitude of the AC voltage induced in the sensor coil, the amplitude of the AC voltage induced in the correction coil, and from this can determine a correction value for the relative position. It is also possible to add the AC voltage (possibly amplified by a factor) from the correction coil to the AC voltage in the sensor coil, in order to correct the latter voltage. In this case, the amplitude, measured by the evaluating unit, of the AC voltage in the sensor coil has already been corrected.

Overall, the linear-path sensor takes up only a small construction space, since the coils can all be integrated within a printed circuit board, and/or the sliding element can be produced in straightforward manner from a metallic block. The sliding element may also be provided by a housing of the component to be measured. Since higher installation tolerances are possible by reason of the compensation, the mounting technology and connection technology can be made cost-effective.

According to one embodiment of the disclosure, the correction coil exhibits at least two opposite-sense partial turns. Just like the sensor coil, the correction coil may exhibit two opposite-sense partial turns which reciprocally cancel out, at least partly, the AC voltage induced in them. The arrangement of the partial turns and/or the area thereof may have been adjusted in such a way that, overall, no AC voltage is induced in the correction coil when no lateral offset is present.

If the constant geometry of the sliding element is an edge of the sliding element, in this case the one partial turn may be arranged above the sliding element, and the other partial turn may be arranged alongside the sliding element. A junction between the partial turns may in this case be situated on the edge.

The partial turns of the correction coil may also be arranged side-by-side at right angles to the measurement path above the constant geometry of the sliding element. In this way, a lateral offset of the sliding element results in a changed coverage of the constant geometry with respect to the partial turns.

According to one embodiment of the disclosure, the correction coil exhibits four opposite-sense partial turns, of which two inner partial turns are arranged above the variable geometry, and two outer partial turns are each arranged above a geometry which is constant along the measurement path. The two inner partial turns may have the same geometry as the sensor coil. Overall, in this way the correction coil can supply an AC voltage that is at least proportional to the AC voltage of the sensor coil when no lateral offset is present. If a lateral offset is present, the amplitudes of the two AC voltages differ from one another. From the difference of the amplitudes, the offset correction for the relative position of the measurement path can then be calculated by the evaluating unit.

According to one embodiment of the disclosure, the linear-displacement sensor includes two or more correction coils. With several correction coils, on the one hand the determination of a lateral offset can be improved. Optionally, a tilting and/or twisting of the sliding element in relation to the base element can also be determined.

According to one embodiment of the disclosure, the linear-displacement sensor exhibits two correction coils with, for instance, only one turn each. In this case, the evaluating unit can, in each instance, measure an AC voltage induced in the respective correction coil, and from the two amplitudes can calculate (for instance, by taking the difference) a lateral offset or an offset correction for the relative position.

According to one embodiment of the disclosure, the linear-displacement sensor exhibits two correction coils which are connected in series. If two correction coils are connected in series in such a way that the AC voltages induced in them cancel each other out if no lateral offset is present, an offset correction for the relative position can be calculated from the AC voltage applied in total to the two correction coils.

In this case, the two correction coils, which may be arranged on opposite sides of the sliding element, can assume the role of the partial turns of a correction coil. However, the two correction coils may be arranged far away from one another.

According to one embodiment of the disclosure, one or more of the correction coils is/are connected in series with the sensor coil. In this way, given appropriate choice of the areas of the coils or of the partial turns of the correction coils and sensor coil, a faulty signal of the sensor coil by virtue of an offset can already be corrected in analog manner by adding and/or subtracting the signal(s) of the one or more correction coils. Depending upon the interconnection of the correction coils and/or of the sensor coil, no mathematical processing of the digitized signals is necessary for correcting the lateral offset. A series connection of the coils automatically yields the correct signal.

According to one embodiment of the disclosure, the linear-displacement sensor exhibits two correction coils which are respectively arranged, in the case of a constant geometry of the sliding element, to the left and to the right of the variable geometry. In this way, a twisting and/or a tilting of the sliding element can also be detected with the correction coils. The two correction coils may in this case be arranged on both sides of the sliding element.

According to one embodiment of the disclosure, the excitation coil is designed to induce an AC voltage in the sensor coil and in the correction coil. In other words, a single excitation coil can be used for the sensor coil and the one or more correction coils. The excitation coil, which may exhibit only one turn, can surround the sensor coil and/or the correction coil (in top view of the sensor element).

According to one embodiment of the disclosure, the linear-displacement sensor includes an additional excitation coil for the correction coil, which is designed to induce an AC voltage in the correction coil. It is also possible that one or more additional excitation coils are provided for the one or more correction coils. For instance, a specific excitation coil may be provided for each correction coil. The excitation coils can all be supplied with the same AC voltage.

According to one embodiment of the disclosure, the partial turns of the sensor coil are arranged side-by-side at right angles to the measurement path. In particular, a junction-point of the partial turns may be arranged above a center of the variable geometry of the sliding element. At one end of the measurement path the one partial turn may exhibit maximal inductive coupling with the excitation coil, and the other partial turn may exhibit minimal inductive coupling with the excitation coil. At the other end of the measurement path it may be the other way round.

The partial turns of the sensor coil may have the same area, and in this way the AC voltages induced into the partial turns are able to cancel one another out in the case of identical inductive coupling with the excitation coil.

According to one embodiment of the disclosure, the linear-displacement sensor exhibits two sensor coils with, in each instance, two opposite-sense partial turns, the two sensor coils being arranged side-by-side at right angles to the measurement path above the variable geometry of the sliding element. In this way, the (uncorrected) relative position of the measurement path can be calculated on the basis of two measuring signals.

According to one embodiment of the disclosure, the variable geometry includes a groove of the sliding element extending obliquely relative to the measurement path. This groove can, for instance, be milled into a sliding element made of metal.

According to one embodiment of the disclosure, the constant geometry includes a groove of the sliding element extending parallel to the measurement path. This groove can also, for instance, be milled into a sliding element made of metal.

However, it is also possible that in the case of a sliding element made of synthetic material a groove is filled with a metallic element, in order to provide a variable and/or constant geometry with regard to the sliding-path.

According to one embodiment of the disclosure, the constant geometry includes a lateral edge of the sliding element extending parallel to the measurement path. In other words, a correction coil can be placed above a lateral edge (which is present anyway) of the sliding element.

According to one embodiment of the disclosure, the excitation coil, the sensor coil and/or the correction coil are realized as planar coils in a circuit board. The printed circuit board, which may be of multilayer construction, may exhibit conducting tracks (on several levels), by which the coils have been formed.

Ideas relating to embodiments of the disclosure may, amongst other things, be regarded as being based on the concepts and findings described in the following.

BRIEF DESCRIPTION OF THE DRAWINGS

Embodiments of the disclosure will be described in the following with reference to the appended drawings, in which connection neither the drawings nor the description are/is to be construed as restricting the disclosure.

The figures are merely schematic and not true to scale. Identical reference symbols designate identical or identically-acting features in the figures.

DETAILED DESCRIPTION

Figure 1A:
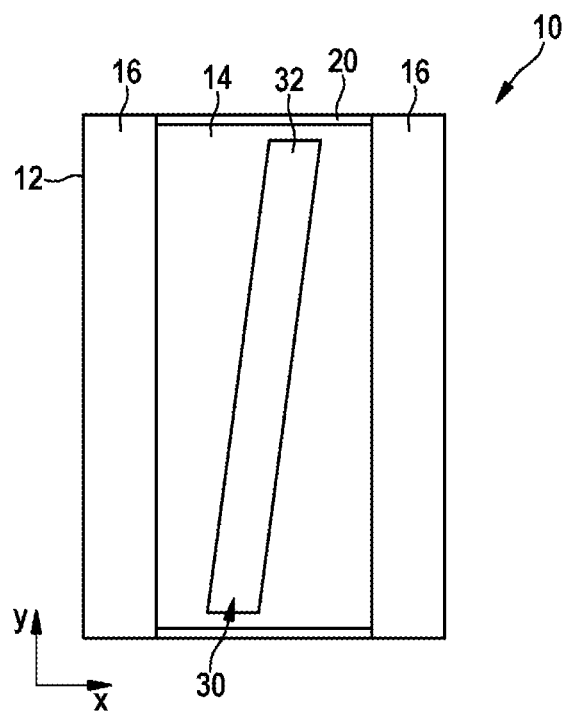
FIG. 1A shows schematically a top view of a linear-displacement sensor according to an embodiment of the disclosure.
Figure 1B:
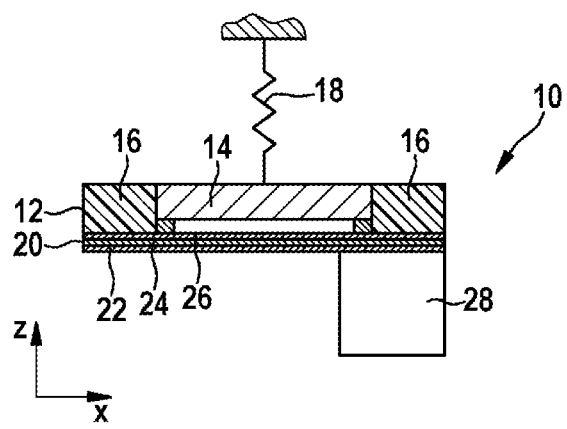
FIG. 1B shows schematically the linear-displacement sensor from FIG. 1A in cross-section.

FIGS. 1A and 1B show a linear-displacement sensor 10 from above and in cross-section. The linear-displacement sensor comprises a base element 12 and a sliding element 14 which is capable of being shifted in a y-direction with respect to the base element 12 and which is guided by a lateral guide 16 of the base element 12. A measurement path of the linear-displacement sensor 10 extends along the y-axis.

The lateral guidance (substantially) prevents a movement of the sliding element in the x-direction. For instance, the sliding element can be pressed against the base element 12 by a spring 18 and/or can in this way be substantially fixed in the z-direction.

The base element 12 includes a printed circuit board 20 on which, for instance, two cuboid synthetic-material elements have been attached as a lateral guide 12. The lateral guide may, for instance, have been manufactured from an electrically non-conductive material (for example, synthetic material such as PA612).

In and/or on the printed circuit board 20, an excitation coil 22, a sensor coil 24 and a correction coil 26 are provided as planar coils which, for instance, may be realized by conducting tracks of a multilayer printed circuit board 20.

Furthermore, on the base element 12 or on the printed circuit board 20 a controller or evaluating unit 28 may have been attached which is designed to energize the excitation coil 22 with an AC voltage and to determine, from signals of the sensor coil 24 and of the correction coil 26, a relative position of the sliding element 14 in relation to the base element 12. Alternatively, the evaluating unit 28 may also be connected to the linear-displacement sensor 10 merely via a cable.

The sliding element 14 may, for instance, be arranged approximately 0.5 mm away from the printed circuit board 20 and/or may have a geometry 30 which is variable with respect to the relative position of the sliding element 14 in relation to the base element 12, in the form of a groove 32 in the sliding element 14 which is oblique in relation to the measurement path or the y-direction and which influences an inductive coupling of the excitation coil 22 with the sensor coil 24.

For instance, the substantially cuboid sliding element 14 may consist of an electrically conducting material (such as metal, for instance), and/or the groove 32 may be provided as a milled cut in the sliding element 14. But it is also possible that the sliding element has been manufactured from an electrically non-conducting material (such as synthetic material, for instance), and the groove 32 has been filled with an electrically conducting material.

By virtue of the sliding element 14, an inductive coupling between the excitation coil 22 and the sensor coil 24 is consequently influenced as a function of the relative position. Via a determination of the inductive coupling, a back-calculation to the relative position is possible.

The figures which now follow show embodiments of coil layouts that can be used with the linear-displacement sensor 10 from FIGS. 1A and 1B.

In the case of FIG. 1, the sensor coil 24 exhibits two equal-area partial turns 34a, 34b which are oriented in opposite directions. The excitation coil 22 surrounds the sensor coil 24 and the two partial turns 34a, 34b. In other words, the sensor coil 24, which generally may consist of an equal number of right-oriented and left-oriented partial turns 34a, 34b, is located in the inner region of the excitation coil 22.

The excitation coil 22 can have an AC voltage applied to it by the evaluating unit 28 and then generates an electromagnetic field. The amplitude of the AC voltage provided by the evaluating unit 28 may amount to 0.5 V to 10 V and may be 1.5 V, for instance. The frequency of the AC voltage may lie within the range from 1 MHz to 10 MHz and may be 5 MHz, for instance.

The sensor coil 24 may be arranged in such a way that a crossing-point 35 of the connections of the partial turns 34a, 34b is placed at the midpoint of the excitation coil 24 and/or on a line of symmetry of the sliding element 14.

Now if no sliding element 14 is present, an equally large voltage of differing sign is induced into each of the right-handed and left-handed partial turns 34a, 34b. The sum of all the component voltages accordingly results in zero. This additionally has the advantage that perturbations as a consequence of external almost homogeneous electromagnetic fields also result in a total voltage of zero and accordingly do not perturb a result of measurement.

The inductive coupling of two coils (for instance, the excitation coil 22 with the sensor coil 24) may, for instance, be determined via the amplitude ratio of induced AC voltage in the one coil (such as the sensor coil 24, for instance) and the voltage applied to the other coil (such as the excitation coil 22, for instance).

On the assumption that the excitation coil 22 is defined as right-handed, a voltage of the same sign is induced into the first partial turn 34a (labeled with a plus sign), and a voltage of opposite sign is induced into the second partial turn 34b (labeled with a minus sign).

In principle it holds that the inductive coupling is minimal in the region that is covered by a metallic surface and is maximal in the region that lies below a recess (such as the groove 32, for instance). In this way, the voltage induced in the first partial turn 34a becomes ever smaller, the further the sensor coil 24 and the excitation coil 22 are pushed upward (or the sliding element 14 downward) from the viewpoint of FIG. 2. Conversely, the voltage induced in the first partial turn 34b becomes ever greater when the two coils 22, 24 are pushed upward. In this way, from the amplitude ratio of the AC voltage in the excitation coil 22 and the sum voltage of the two partial turns 34a, 34b, which is induced as total voltage in the sensor coil 24, the relative position of the sliding element 14 with respect to the base element 12 can be determined by the evaluating unit 28.

However, if a lateral offset of the sliding element 14 (in the x-direction) now occurs, for instance by virtue of component tolerances, an inductive coupling is present between the excitation coil 22 and the sensor coil 24, which in the back-calculation results in a relative position that is different from the actually correct position. This can entail a measuring error that cannot be tolerated for some applications.

In order to determine this lateral offset and to correct the measuring error (at least partly), the correction coil 26 is now used which, just like the sensor coil 22, exhibits two opposite-sense partial turns 36a, 36b. A crossing-point 38 of the partial turns 36a, 36b, at which the one partial turn 36a passes over into the other partial turn 36b, is located in the optimal case on a lateral edge 40 of the sliding element 14 which extends parallel to the y-direction and therefore parallel to the measurement path. A separate excitation coil 22', which can be supplied with the same AC voltage as the excitation coil 22, surrounds the correction coil 26. The correction coil 26 is designed and/or arranged in such a way that it senses merely the lateral edge 40 of the sliding element 14 and not the variable geometry 30 in the middle of the sliding element 14.

The lateral edge 40 of the sliding element 14 can be construed as constant geometry 42 along the measurement path, since in the event of a shift of the sliding element 14 in the y-direction the inductive coupling of the excitation coil 22' with the correction coil 26 does not change.

If a lateral offset now arises between the sliding element 14 and the base element 12, this results in a change in the inductive coupling between the excitation coil 22' and the correction coil 26, which as in the case of the sensor coil 24 can be ascertained in analog manner by the evaluating unit 28 via a change of the amplitude ratio of the induced AC voltage and the applied AC voltage.

Hence further information is available to the evaluating unit 28, with which the measuring error that has arisen by virtue of the lateral offset can be corrected. This can be done, for instance, by adding the amplitude ratio on the basis of the correction coil 26, multiplied by a factor, to the amplitude ratio on the basis of the sensor coil 24.

Although only one conducting track has been represented in each instance, the excitation coil 22, the sensor coil 24, the correction coil 26, and the separate excitation coil 22', as well as the coils shown in the following figures, may be realized with several conductor loops and/or on several levels of the printed circuit board 20.

Figure 2:
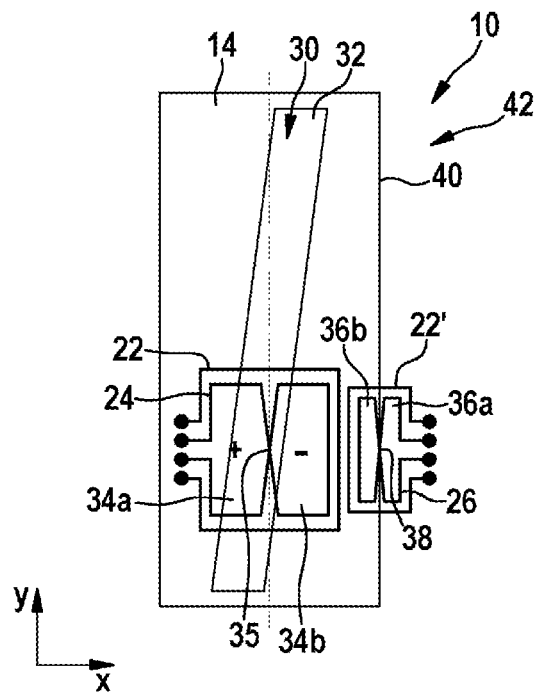
FIG. 2 shows schematically a linear-displacement sensor according to another embodiment of the disclosure.

FIG. 2 shows an arrangement with separate excitation coils 22, 22' for the sensor coil 24 and the correction coil 26. With a separate excitation coil 22' the separate excitation coil 22' can be prevented from coupling the correction coil 26 into the sensor coil 24. A remedy can also be created by a time-division multiplex—that is to say, the excitation coils 22, 22' are supplied with AC voltage in succession and alternately.

Figure 3:
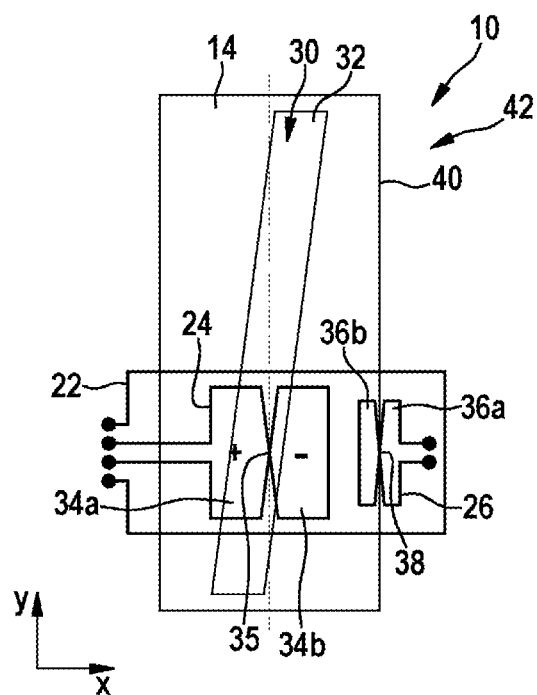
FIG. 3 shows schematically a linear-displacement sensor according to another embodiment of the disclosure.

As FIG. 3 shows, the sensor coil 24 and the correction coil 26 may also be surrounded by a common excitation coil 22.

If, by reason of the guide 16, 18 of the sliding element 14, a tilting of the sliding element 14 about the y-direction or y-axis can be excluded (for example, by the spring 18 which holds the sliding element 14 in its position in the z-direction), a single correction coil 26 may suffice to compensate for a measuring error arising by virtue of component tolerances. As a result, the linear-displacement sensor 10 can be designed to be relatively small.

Figure 4:
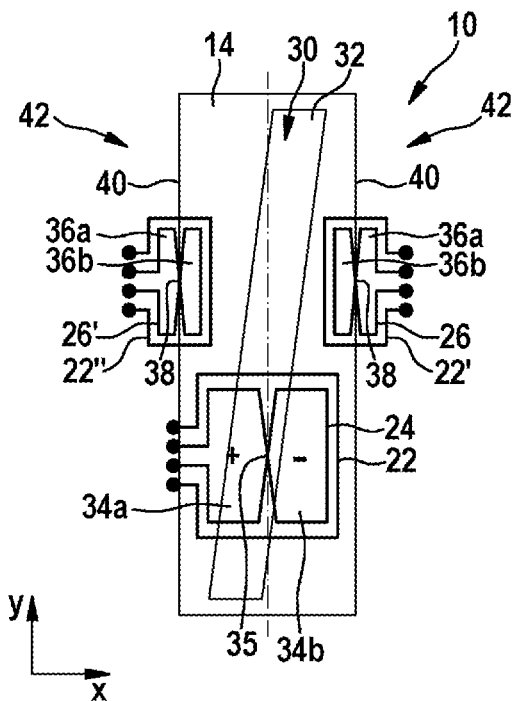
FIG. 4 shows schematically a linear-displacement sensor according to another embodiment of the disclosure.

FIG. 4 shows that several correction coils 26, 26' may also be used which, for instance, may respectively exhibit a separate excitation coil 22', 22''. The correction coils 26, 26' may be arranged in such a way that in each instance half their area is covered in the case of a lateral offset of zero. The terminals of the excitation coils 22', 22'' may be interconnected in such a way that, without lateral offset, the one correction coil 26 supplies a maximally positive signal and the other correction coil 26' supplies a maximally negative signal. If the dimensions of both correction coils 26, 26' are identical, the sum signal yields zero in this case. In the case of a lateral offset of the sliding element 14 in the x-direction, the sum signal still remains zero, though the lateral offset of the sliding element 14 can be back-calculated from the individual amplitudes of the AC voltages induced in the two correction coils 26, 26'. If the sum signal becomes different from zero, a tilt of the sliding element 14 about the y-axis is present. This tolerance can also be determined by the correction coils 26, 26' and subsequently corrected computationally by the evaluating unit 28.

The crossing-points or transition-points 38 between the partial turns 36a and 36b of the two correction coils 26a, 26' may be located on the opposite lateral edges 40 of the sliding element 14.

Although the sensor coil 24 and the correction coils 26, 26' have been represented offset from one another along the measurement path, they may be arranged one above the other in differing locations on a printed circuit board 20. It is also possible that use is made of a single encircling excitation coil 22 with which all the sensor coils 24 and correction coils 26 are coupled.

Figure 5:
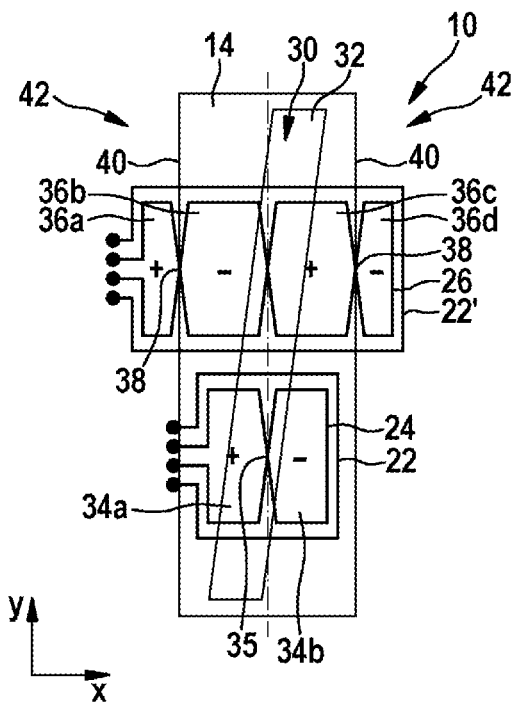
FIG. 5 shows schematically a linear-displacement sensor according to another embodiment of the disclosure.

FIG. 5 shows that the correction coil 26 exhibits two outer partial turns 36a, 36d and two inner partial turns 36b, 36c, which have differing orientations in alternating manner. The two inner partial turns 36b, 36c correspond in their area to the two partial turns 34a, 34b of the sensor coil 24.

Hence the AC voltages of the correction coil 26 that are induced in the partial turns 36b, 36c are just as great, in terms of absolute value, as the AC voltages of the induced in the partial turns 34a, 34b of the sensor coil 24. Only the signs of the AC voltages of the correction coil 26 induced in the partial turns 36b, 36c are opposite to the AC voltages induced in the partial turns 34a, 34b of the sensor coil 24.

The crossing-points or transition-points 38 between the partial turns 36a and 36b and between the 36c and 36d may be located on the opposite lateral edges 40 of the sliding element 14.

The AC voltage induced in the correction coil 26 also contains, in addition to information about the relative position in the y-direction, information about the lateral offset of the sliding element 14 in the x-direction. The information about the lateral offset can, for instance, be extracted by subtracting the AC voltages in the two coils 24, 26. Hence the determination of the relative position with the sensor coil 24 can be made plausible, and/or the lateral offset can be compensated.

Figure 6:
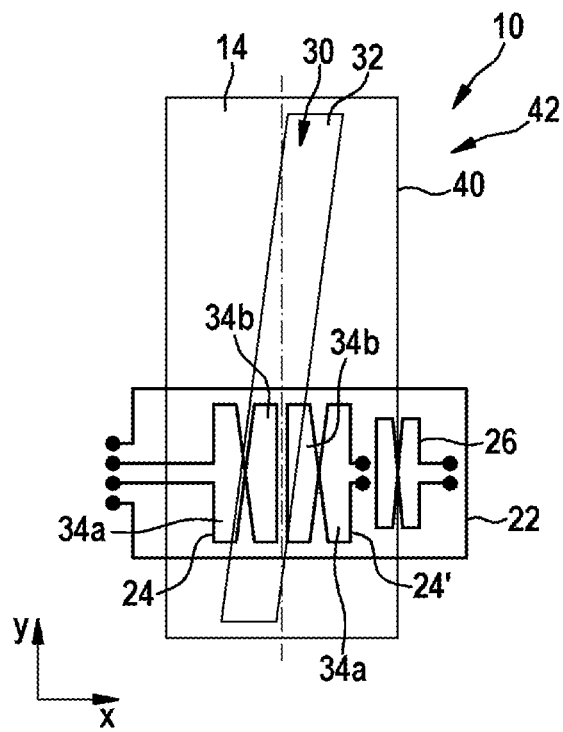
FIG. 6 shows schematically a linear-displacement sensor according to another embodiment of the disclosure.

FIG. 6 shows that the linear-displacement sensor 10 may also exhibit two sensor coils 24, 24'. Each of the sensor coils 24, 24' may respectively comprise two partial turns 34a, 34b of equal area and/or opposite orientation.

The one sensor coil 24 may cover a region to the left of an axis of symmetry of the sliding element 14, and the other sensor coil may cover a region to the right of the axis of symmetry. The width of each sensor coil 24, 24' may correspond roughly to the width of the groove 32.

Accordingly, a maximal resolution of the linear-displacement sensor 10 is obtained, since when the complete measurement path is traversed each sensor coil 24, 24' is full at one position and not covered at all at another position.

Figure 7:
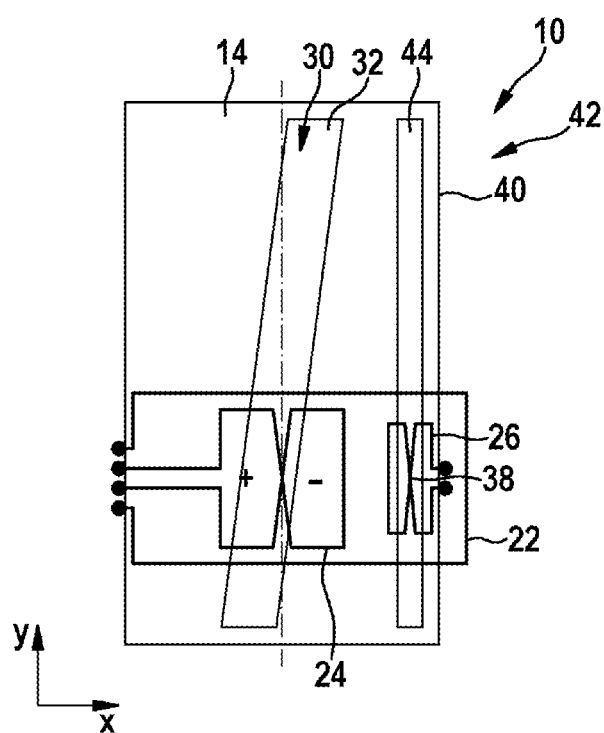
FIG. 7 shows schematically a linear-displacement sensor according to another embodiment of the disclosure.

FIG. 7 shows an alternative design of a geometry 42 which is constant along the measurement path and which is implemented with a groove 44 arranged parallel to the measurement path. The correction coil 26 in this case is arranged above the groove 44.

If, for instance, the place of installation of the sliding element 14 should not permit one or more correction coils 24 to be arranged above the lateral edge 40 of the sliding element, a second groove 44 can be introduced into the sliding element 14, the geometry of which remains constant along the measurement path. If the correction coil 26 is arranged in such a manner that the crossing-point 38 lies on a central axis of the groove 44, the correction coil 26 without lateral offset always supplies a voltage value of zero. The direction of an offset in the x-direction can be determined via the sign of the voltage of the correction coil 26, and the magnitude of the offset can be determined via the amplitude level.

Figure 8:
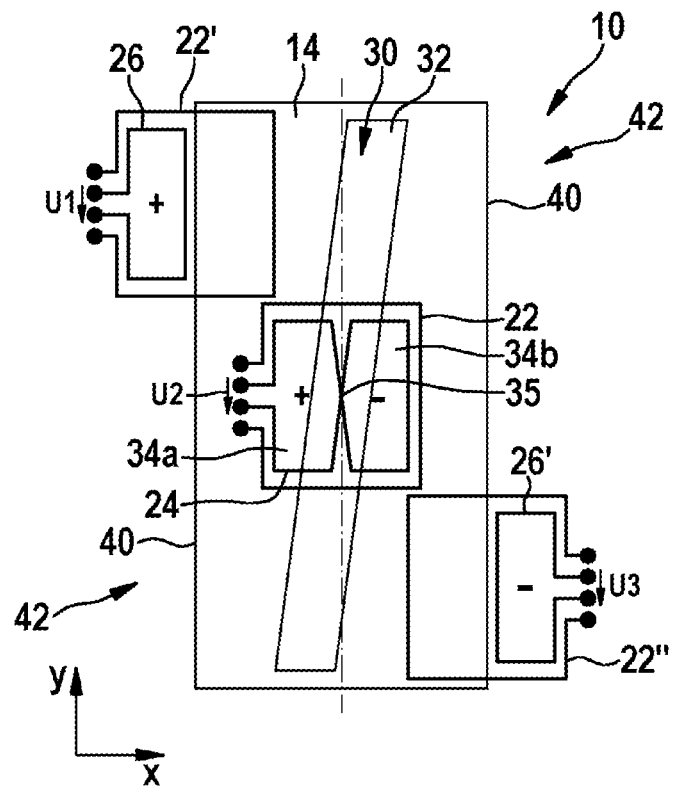
FIG. 8 shows schematically a linear-displacement sensor according to another embodiment of the disclosure.

FIG. 8 shows a linear-displacement sensor 10 with two correction coils 26, 26' which each exhibit only one turn. The sensor coil 24 and the two correction coils 26, 26' respectively exhibit an excitation coil 22, 22', 22".

The area of each of these turns may be identical to the areas of the partial turns 34a, 34b of the sensor coil 24. Moreover, the excitation coils 22, 22', 22" may have an identical shape. Now if by way of measuring voltage the voltage U2 of the sensor coil 24 is not used, but use is made of the sum of all the voltages U1 (voltage at the first correction coil 26), U2 and U3 (voltage at the second correction coil 26'), a lateral offset is compensated automatically. To this end, all three coils 24, 26, 26' can be connected in series, so that the correction coils 26, 26' are oriented in opposing manner relative to one another (indicated by "+" and "−").

Figure 9:
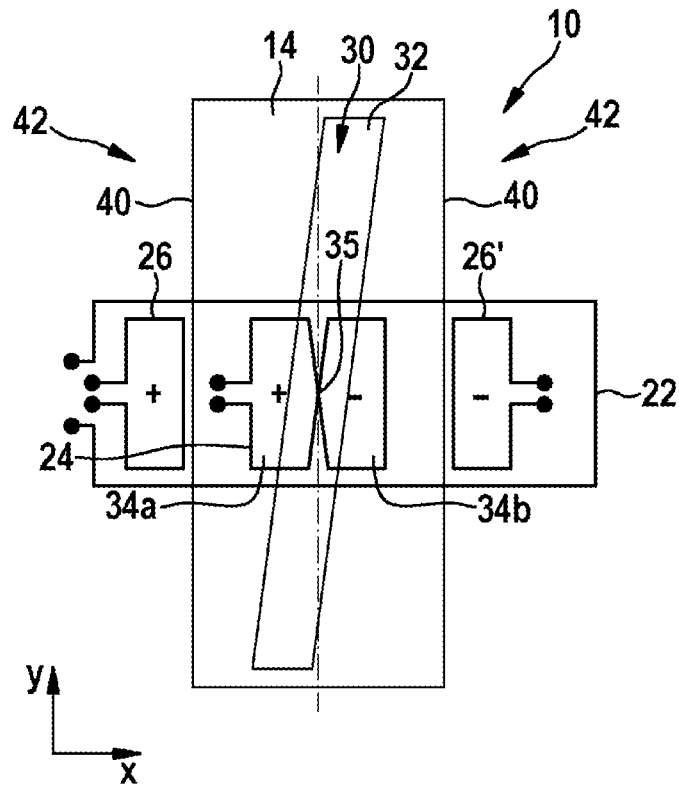
FIG. 9 shows schematically a linear-displacement sensor according to another embodiment of the disclosure.

FIG. 9 shows a sensor coil 24 and two correction coils 26, 26', analogous to FIG. 8, which together are surrounded by an excitation coil 22. Here too, given an appropriate choice of the areas of the partial turns 34a, 34b of the sensor coil 24 and individual turns of the correction coils 26, 26', the coils 24, 26, 26' can be connected in series, in order to compensate for an offset in analog manner.

The numbers of turns of the individual coils 24, 26, 26' can also be adapted in such a way such that the sum of all the voltages U1, U2, U3 (of both correction coils 26, 26' plus that of the sensor coil 24) without sliding element 14 is zero. The voltages can also be summed only after amplification by electronics. The amplification factors in this case have been designed in such a way that the sum of all the voltages U1, U2, U3 without sliding element is zero.

But it is also possible to compensate for the offset with the evaluating unit digitally, by the amplitude level of the induced AC voltage being ascertained for each coil 24, 26, 26' and by the amplitude level being added up after multiplication by a factor, in order to obtain a corrected amplitude level for the sensor coil 24.

In conclusion, it should be pointed out that terms such as "exhibiting", "including" etc. do not exclude other elements or steps, and terms such as "a" or "an" do not exclude a plurality. Reference symbols in the claims are not to be regarded as a restriction.

The invention claimed is:

1. A linear-displacement sensor comprising:
a base element;
a sliding element, which is at least partly electrically conductive, configured to shift relative to the base element in a direction along a measurement path, the sliding element having a material body that defines a first geometry that is variable along the measurement path and that defines a second geometry that is constant along the measurement path;
an excitation coil arranged above the measurement path;
a sensor coil having two opposite-sense partial turns, the sensor coil being arranged with respect to the excitation coil such that a first AC voltage is induced in the sensor coil upon application of a second AC voltage to the excitation coil, the sensor coil being arranged with respect to the first geometry of the sliding element such that an inductive coupling of the sensor coil with the excitation coil, and hence an amplitude of the first AC voltage induced in the sensor coil, is dependent on a relative position of the sliding element in relation to the base element in the direction along the measurement path; and
a correction coil arranged with respect to the second geometry of the sliding element such that an inductive coupling of the correction coil, and hence an amplitude of a third AC voltage induced in the correction coil, is dependent on a lateral offset of the sliding element in relation to the base element and independent of the relative position of the sliding element in relation to the base element in the direction along the measurement path.

2. The linear-displacement sensor as claimed in claim 1, wherein the correction coil has at least two opposite-sense partial turns.

3. The linear-displacement sensor as claimed in claim 2, wherein the at least two opposite-sense partial turns of the correction coil are arranged side-by-side at right angles to the measurement path above the second geometry of the sliding element.

4. The linear-displacement sensor as claimed in claim 1, wherein the correction coil has four opposite-sense partial turns including (i) two inner partial turns arranged above the first geometry of the sliding element and (ii) two outer partial turns are arranged above the second geometry of the sliding element.

5. The linear-displacement sensor as claimed in claim 1, wherein the correction coil comprises two correction coils.

6. The linear-displacement sensor as claimed in claim 5, wherein the two correction coils are arranged on opposite sides of the first geometry from one another.

7. The linear-displacement sensor as claimed in claim 5, wherein the two correction coils each have only one turn.

8. The linear-displacement sensor as claimed in claim 1, wherein at least one of (i) the correction coil comprises two correction coils which are connected in series and (ii) the correction coil and the sensor coil are connected in series.

9. The linear-displacement sensor as claimed in claim 1, wherein at least one of (i) the excitation coil is configured to induce the first AC voltage in the sensor coil and induce the third AC voltage in the correction coil and (ii) the excitation coil surrounds at least one of the sensor coil and the correction coil.

10. The linear-displacement sensor as claimed in claim 1, further comprising:
an additional excitation coil arranged with respect to the correction coil so as to induce the third AC voltage in the correction coil.

11. The linear-displacement sensor as claimed in claim 1, wherein at least one of (i) the two opposite-sense partial turns of the sensor coil are arranged side-by-side at right angles to the measurement path and (ii) the two opposite-sense partial turns of the sensor coil have a same area.

12. The linear-displacement sensor as claimed in claim 1, wherein:
the sensor coil comprises two sensor coils and the two sensor coils each have two opposite-sense partial turns, and
the two sensor coils are arranged side-by-side at right angles to the measurement path above the first geometry of the sliding element.

13. The linear-displacement sensor as claimed in claim 1, wherein at least one of:
(i) the first geometry of the sliding element includes a groove defined in the material body of the sliding element extending obliquely relative to the measurement path,
(ii) the second geometry includes another groove defined in the material body of the sliding element extending parallel to the measurement path, and
(iii) the second geometry includes a lateral edge of the material body of the sliding element extending parallel to the measurement path.

14. The linear-displacement sensor as claimed in claim 1, wherein at least one of the excitation coil, the sensor coil and the correction coil are planar coils in a printed circuit board.

* * * * *